(12) United States Patent  (10) Patent No.: US 8,535,165 B2
O'Kelley et al.  (45) Date of Patent: Sep. 17, 2013

(54) SETTING UP ON-LINE GAME SESSIONS OUT OF A GAME CONTEXT

(75) Inventors: Patrick W. O'Kelley, Seattle, WA (US); J. Clinton Paul Fowler, Seattle, WA (US); Johan Peter Hansen, Bellevue, WA (US); William B. Fulton, Seattle, WA (US); Jerry Alan Johnson, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/548,650

(22) Filed: Jul. 13, 2012

(65) Prior Publication Data

US 2012/0283023 A1  Nov. 8, 2012

Related U.S. Application Data

(63) Continuation of application No. 11/156,877, filed on Jun. 20, 2005, now abandoned.

(51) Int. Cl.
*G06F 17/00* (2006.01)

(52) U.S. Cl.
USPC ............................................. 463/42; 463/29

(58) Field of Classification Search
USPC ..................................................... 463/42, 29
See application file for complete search history.

(56) References Cited

U.S. PATENT DOCUMENTS

| | | | |
|---|---|---|---|
| 5,586,257 A | 12/1996 | Perlman | |
| 6,352,479 B1 | 3/2002 | Sparks, II | |
| 6,817,947 B2 | 11/2004 | Tanskanen | |
| 6,821,205 B2 | 11/2004 | Takahashi et al. | |
| 7,311,608 B1 | 12/2007 | Danieli et al. | |
| 7,614,955 B2 | 11/2009 | Farnham et al. | |
| 2001/0044339 A1 | 11/2001 | Cordero et al. | |
| 2002/0147645 A1 | 10/2002 | Alao et al. | |
| 2004/0097287 A1 | 5/2004 | Postrel | |
| 2004/0204225 A1* | 10/2004 | Campo et al. | 463/19 |
| 2004/0224773 A1 | 11/2004 | Sham | |
| 2005/0192097 A1 | 9/2005 | Farnham et al. | |

FOREIGN PATENT DOCUMENTS

| | | |
|---|---|---|
| JP | 2003-088677 | 3/2003 |
| JP | 2004-141525 | 5/2004 |
| JP | 2004-298373 | 10/2004 |
| KR | 20030037466 A | 5/2003 |
| WO | 2005006152 A2 | 1/2005 |

OTHER PUBLICATIONS

Microsoft Case Study, "Innovative online gameplay community serves up 4 million pages per day", http://tech.msn.com/guides/1199615.armx, 2005, pp. 1-7.

"Quake." Wikipedia, The Free Encyclopedia. Feb. 22, 2009, 05:58 UTC. Feb. 25, 2009 http://en.wikipedia.org/w/index.php?title=Quake&oldid=272432231.

(Continued)

*Primary Examiner* — Michael Cuff

(57) ABSTRACT

A service that provides for setting up game sessions for a plurality of game players. A number of game players that each have a computing device capable of playing a computer game are linked together by the service. The service allows a player to set up a common game session so that a subset of the players can simultaneously start playing the game at the same level. Additionally, the service allows game competitions to be structured and played among a subset of the game players.

20 Claims, 10 Drawing Sheets

(56) References Cited

OTHER PUBLICATIONS

"Client-side prediction." Wikipedia, The Free Encyclopedia. Feb. 3, 2009, 23:38 UTC. 25 Feb. 29 http://en.wikipedia.org/w/index.php?title=Client-side_prediction&oldid=268359201.

"Unreal Networking Architecture." Epic MegaGames, Inc. Jul. 21, 1999 http://unreal.epicgames.com/network.htm.

"Supplementary European Search Report", Mailed Date: Feb. 7, 2012, Application No. 06759113.1, Filed Date: May 5, 2006, pp. 3.

\* cited by examiner

SETTING UP ON-LINE GAME SESSIONS OUT OF A GAME CONTEXT

CROSS-REFERENCE OF RELATED APPLICATIONS

This application claims the benefit of, and priority to, previously filed U.S. patent application Ser. No. 11/156,877 entitled "SETTING UP ON-LINE GAME SESSIONS OUT OF A GAME CONTEXT" filed on Jun. 20, 2005, the subject matter of which is hereby incorporated by reference in their entirety.

FIELD OF THE INVENTION

This invention generally relates to the field of gaming and multimedia devices. In particular, the present invention is directed to on-line game sessions.

BACKGROUND OF THE INVENTION

In online gaming, game hosting services and game developers have created a number of ways to track and personalize the online gaming experience. One drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a gamer player's history, all of the games he's played, the amount of time he spends online, the size of his Friends list and all of the games that Friends have played or are playing, the Friends invites sent and received, the Messages sent and received, and all of the Feedback the gamer has given and received.

Systems have tried to leverage these on-line communities to match various players to allow them to play multi-player games. Nevertheless, in general such systems, which typically emphasize skill or experience in a single game or small family of games, do not allow groups of players who are likely to enjoy shared interaction based on a variety of personal considerations to form a group outside of the game context and then collectively engage in a multiplayer game.

In general, console-based matchmaking and competitions systems have been limited by the creativity and resources of each individual game development team. Each team must write its own match and competitions interface. For gamers, this means that he or she must relearn the matchmaking or competitions UI each time. Since each game creates its own matchmaking and competitions systems, gamers have had no way to view match and competition options across a service. Gamers have little sense of where the biggest communities of players are or which ones are hosting the most competitions.

Further, because matchmaking interfaces have typically been part of each individual game's code, gamers have not had the ability to create a match with other players in one game and then roam with that group of players to another game.

While some games have used the Web for creating, managing, and viewing the status of console competitions, the experience has involved a complex series of steps for gamers and for game developers to make it work. Further, the Web competition management systems have been tied closely to a particularly family of games developed. Games outside of the family of titles cannot benefit from the Web system.

SUMMARY OF THE INVENTION

The invention comprises systems and methods for playing a multi-player computer-based game.

The systems and methods receive configuration settings from the plurality of different games. The configuration settings provides information regarding parameters of the game so that said service has the capability of matching a plurality of players according to the game's allowed parameters or let players create party sessions according to those parameters and then invite other play in them.

A service is provided that has a database with information about a plurality of players and information about a plurality of different games that operate on a computing device. Coupled to the service is an input device for receiving from a player a selection of one of the plurality of different games and the player's particular choice among the configuration settings for said game. The service is functional apart from the game and allows the player to select any one of a number of different games from different game developers. Also coupled to the service is an output device for outputting a start message to a plurality of computing devices wherein said computing devices are selected as a function of the plurality of players and the one of the plurality of different games. The message contains information indicative of the configuration settings so that all of the computing devices can begin the game in the same way. The system also includes a party and session management API for maintaining between the game and the console a unique identifier that describe groupings of players. Also couple to the service is an input device for accepting a game completed message from a game. This message contains information about the party of players returning to the console to choose to play a different game.

The information in the database about the plurality of players comprises information indicative of game playing skill and social attributes of said players. The systems and methods are capable of matching a subset of players as a function of the game playing skill and social attributes of said players.

Additionally, the systems and methods can be extended for structured competitions. In such cases, after each round of competition, the systems and methods provide a plurality of start messages to the players as a function of players remaining in the competition.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
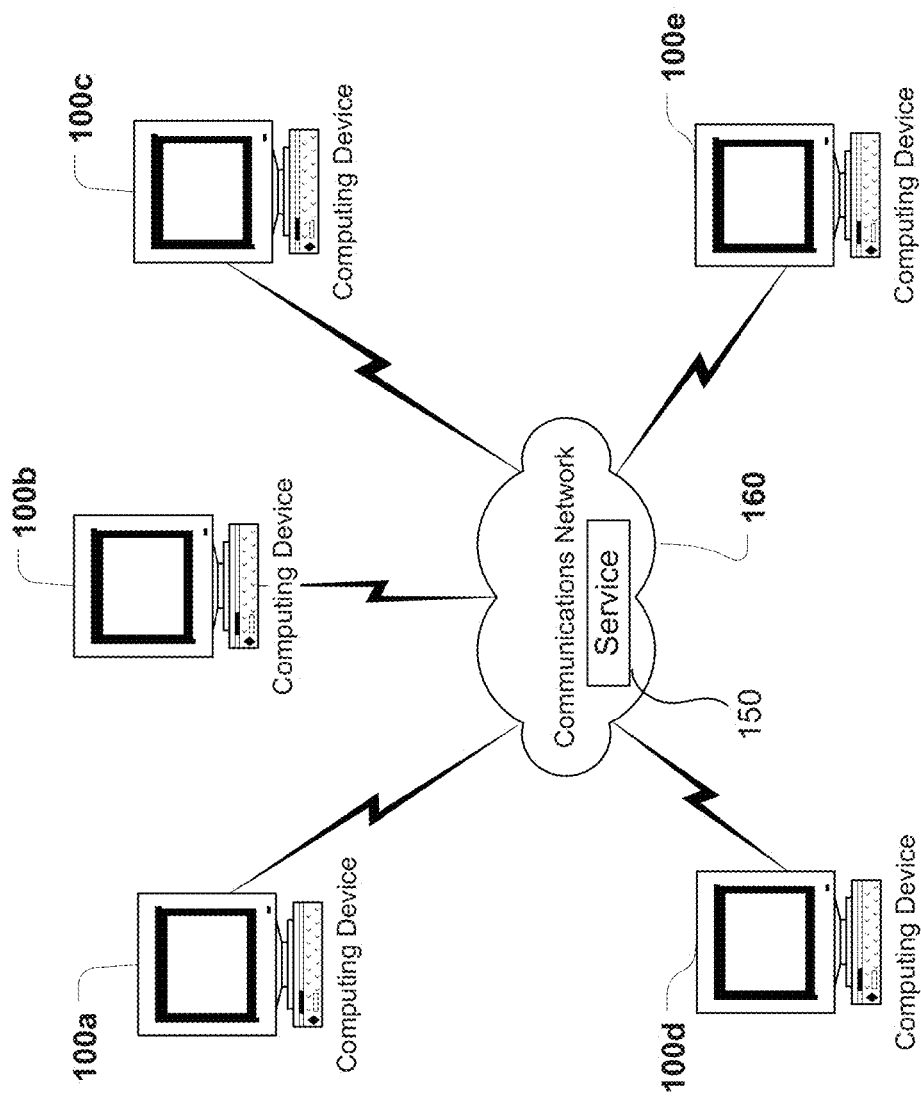
FIG. 1 is a block diagram of an exemplary computer network environment in which aspects of the present invention may be implemented.

FIG. 1 is diagram of an exemplary computer network that serves to illustrate aspects of the invention. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There is a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the present invention could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprises a distributed computing environment. In such an environment a computing task may be spread over a number of computing devices that are addressable elements in a computer network.

According to an aspect of the invention, communication network 160 may host a service 150 that is accessible from the plurality of computers 100a-100e. The service 150 gathers information and tracks users of computers 100a-100e to provide computing services for all of the users of the service.

Figure 2:
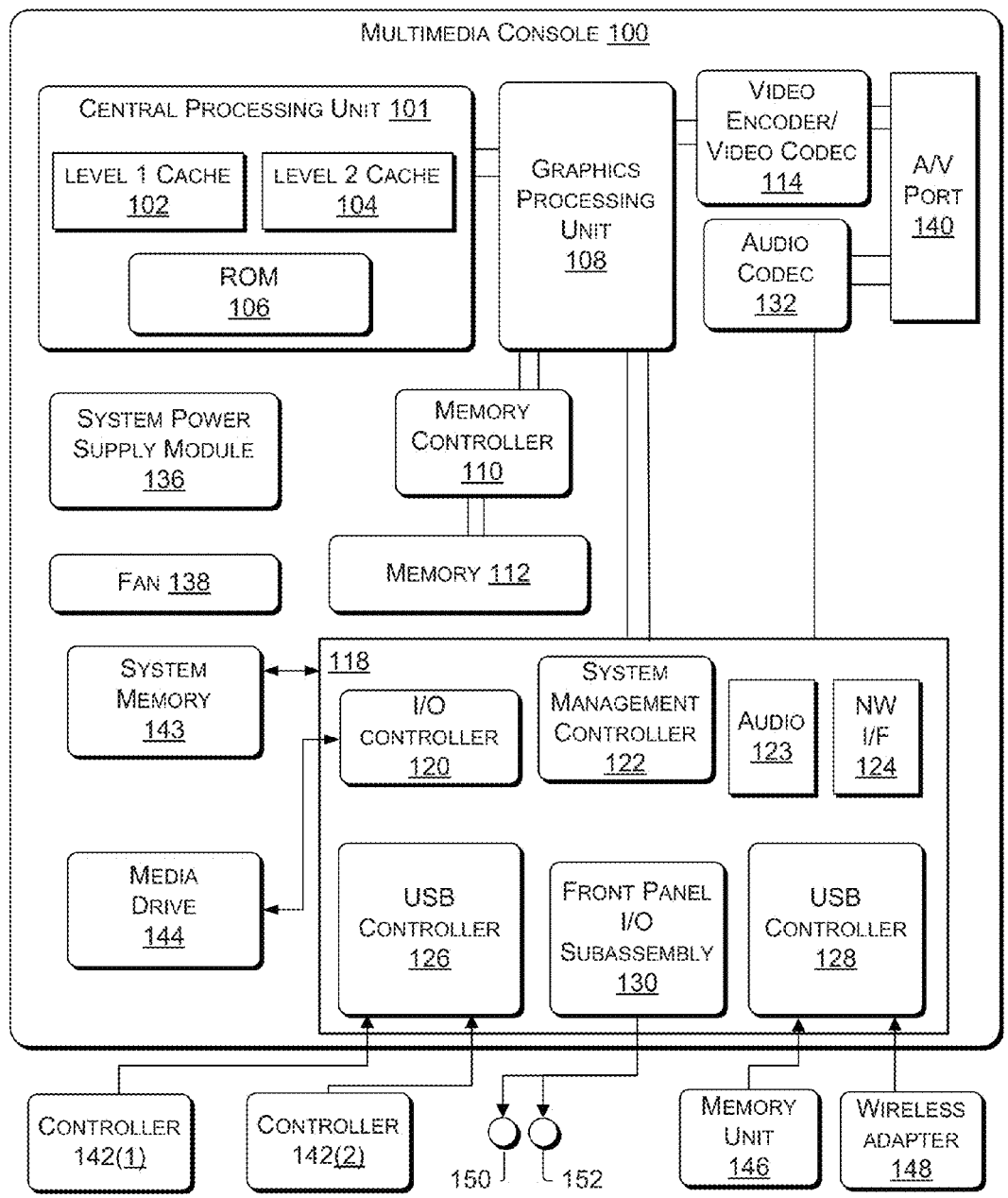
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of the invention, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the system contemplates a schematized, configuration driven process where each game generates a configuration file (according the schema defined by the service) that defines the game data for a particular game. Through a game configuration process, games describe the data the game generates about each game player. By using the configuration process, the service will be able to understand the data as it flows from the game, and it will be able to integrate it in meaningful ways with the other data that the service understands to create a rich profile of each user of the service. The profile will follow the user wherever he goes on the service, i.e. it is game and location independent.

For each user (alternatively referred to as a player or gamer), the service will collect a number of pieces of data (called Profile Data) to build the User Profile in every game session—and even after a game session is concluded. In general, the pieces of the service experience that feed profile include:

1. What the user says about himself or herself (including account set up and the construction of an elaborate personal profile, including the preferred social gameplay "zone").
2. What others say about the user (feedback scores and a publicly visible reputation).
3. What the games say about the user (game configuration and integration of data that comes out of game play to compute a player's skill, among other things).
4. What the system says about the user (time online, aggregates of games played, Friends list, console behavior etc.)

The system creates a "User Profile," which serves as a building block for services and applications that aim to create a social community of gamers and grow relationships among players. The User Profile is the entirety of information (e.g., metadata) related to a specific user (i.e., the game player's digital identity). The User Profile is developed from a set of services that collect and expose this information in a meaningful way to the community. The User Profile also provides for personalization such that users can customize and enhance their gaming experience. As will be discussed in greater detail below, the User Profile consists of various components, including, but not limited to, a Gamercard, game achievements, and gamer preferences.

Figure 3:
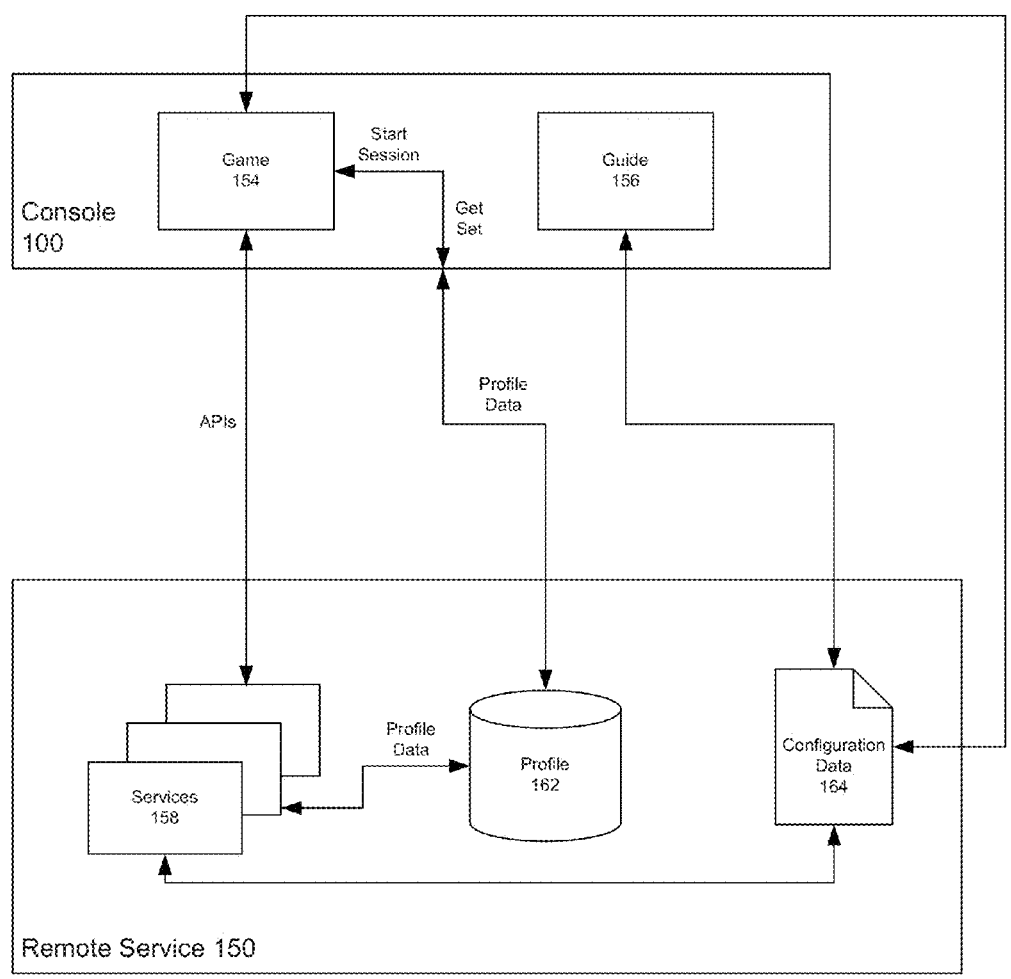
FIG. 3 is a block diagram illustrating the interaction of a console with the remote service.
Figure 4:
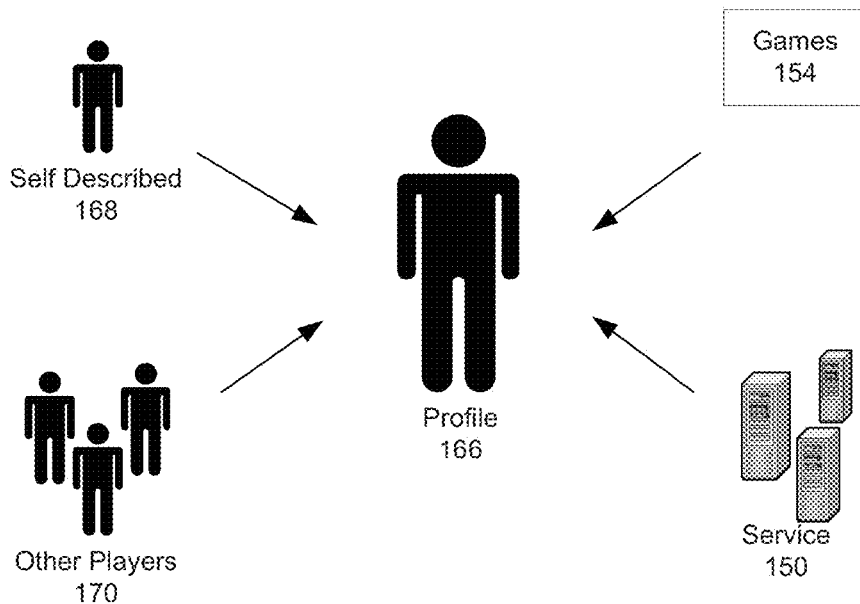
FIG. 4 illustrates the information gathered to build a User Profile.

Referring to FIG. 3, there is illustrated an overview of an exemplary architecture that may be used to implement the User Profile interaction as well as user interaction with the game session service described more fully herein. The console 100 interacts with a remote service 150 that provides services 158 such as voice/chat, a friends list, matchmaking, content download, roaming, feedback, tournaments, voice messaging, and updates to gamers. The service 150 also maintains the User Profiles in a profile database 162 and configuration data 164 used by the services 158 and games 154. The service 150 collects User Profiles, aggregates, processes information supplied by other services 158, and fulfills real-time client requests for retrieving User Profile-related services. The User Profiles in the database 162 are also used by the games 154 to enable, among other things, personalization and customization, etc.

Using the console 100, the user may interact with a Guide 156. The Guide 156 provides an interface where the user may navigate to, and enter, various online areas and options provided by the service 158. The configuration data 164 stored by the service 150 may be used to determine features and options provided by the Guide 156. When the game 154 is running, a defined set of APIs (including SetContext, SetProperty, SetAchievement, and Session APIs for writing data about players, and a number of specialized read APIs for viewing stats, achievements, and other User Profile data) are used to call and interact with the services 158. When requesting User Profile information via the APIs, the game 154 may pass a unique identifier of a user. The service 150 may return a Gamercard (discussed below), game stats, game achievements, affiliations, game settings. etc. Additional details of the various aspects of the exemplary architecture are provided below.

Service 158 assists in tracking and displaying a wide-variety of in-game stats, such as number of kills, best lap times, and (importantly, for calculating the skill value needed in Matchmaking) win/loss. All stats are provided by the various games that a user plays and provided to the service for inclusion in a player's User Profile. For example, a first-person shooter title may want to define a 'Kills' Property to be tracked independently for each 'Map' Context (e.g. 5 Kills on Blood Creek vs. 10 Kills on Battle Range). That information could be displayed as:

| "PER-MAP KILLS" | |
| --- | --- |
| Map | Kills |
| Blood Creek | 5 |
| Battle Range | 10 |

Each game should support a minimal set of information that matches the character of the game and that can be tracked for each user of the service 158.

The owner of User Profile 166 can edit his/her User Profile 166 directly and control who can view each section of the User Profile. The User Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the User Profile 166 to, e.g., restrict presence information only to friends, allow game achievements to be visible to all, etc.

The User Profile is associated with a list of other players known as "Friends." Friends are other games who the player has invited (and who have accepted the invitation) to be on a Friends List.

The User Profile is also associated with a list of players known as "Recent Players." The Recent Players are a list of the most recent N players that the User Profile owner has played with across all games.

The User Profile 166 may include feedback provided by other players 170. Feedback helps others learn about a particular gamer. For example, if the gamer uses foul language or aggressive play in game sessions, other gamers may submit feedback to the service 150. The feedback mechanism improves the user experience by building reputations. Players are therefore anonymous, but not unknown because of the accumulated feedback.

In another aspect of the system, the service 150 and games 154 track online and offline activity of users to provide usage statistics in the Gamer Profile 166. When a gamer plays online, a particular game title is added to list of games played that is made visible to others. While offline, the game console 100 and game 154 track the user's activity via a mechanism for instrumenting games to collect detailed information about a specific player's in-game statistics and accomplishments.

The Gamer Profile 166 is updated during the next connection to the service 150 to reflect the offline play. Game achievements may be reported to the service 154 by games via the User Profile data mechanism.

Referring to FIGS. 5-8, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166. Gamers may use the Gamercard to set up a matchmaking list where gamers are added to a preferred player's list to play again in the future.

Figure 5:
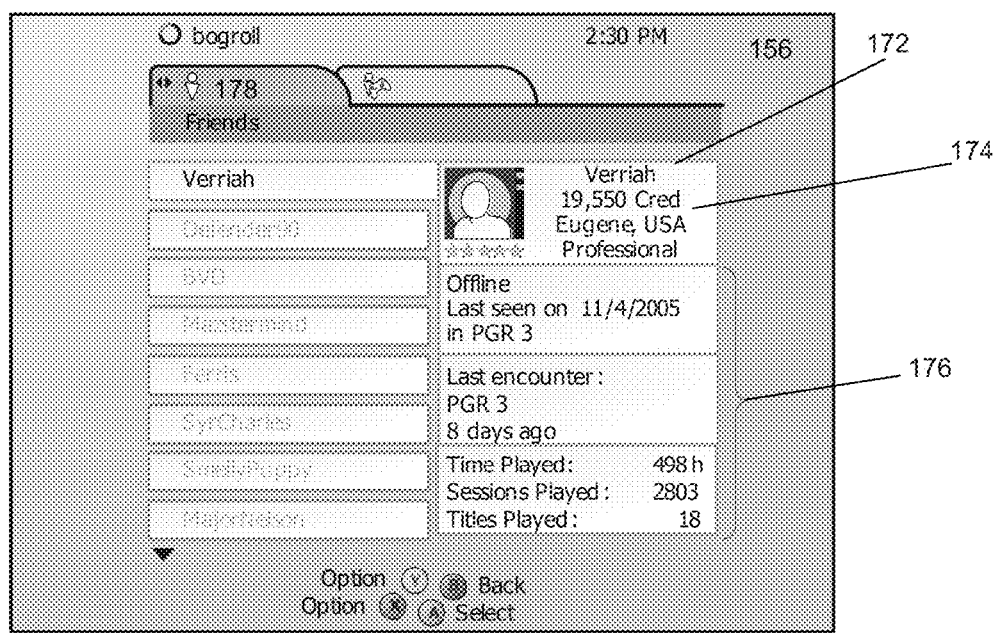
FIG. 5 is example illustration of a user interface displaying User Profile information.

As shown in FIG. 5, the Gamercard 172 may be divided into two regions, a base area 174 and a context-specific (or extended) area 176. The base area 174 provides a set of Gamer Profile information in a standard and consistent way across multiple contexts, whereas the extended area 176 may be customized to fit a specific context. Although the Gamercard 172 of FIGS. 5-8 are shown in the context of the Guide 156, the Gamercard 172 may be visually separated from the rest of the screen and adopt the background color of the screen it is displayed on.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

Figure 6:
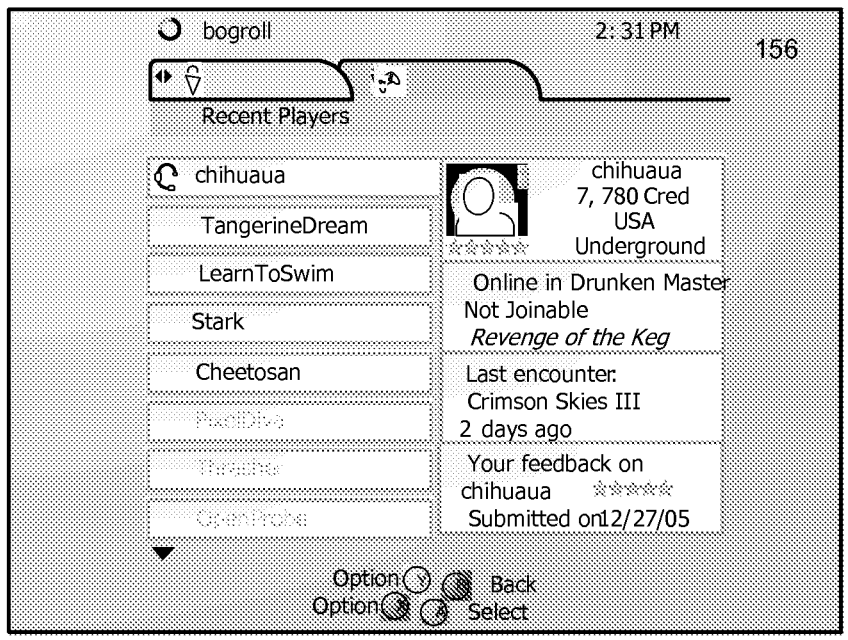
FIG. 6 is another example illustration of a user interface displaying User Profile information.
Figure 7:
FIG. 7 is another example illustration of a user interface displaying User Profile information.

The extended area 176 may include a set of Gamercard Actions, such as "View Profile," "Send Friend Invite," and "Send Feedback," etc. The extended area of the Gamercards is preferably not fixed in size, because it may vary based on the context. As shown in FIGS. 5-7 a user may scroll through the list of other users via the Guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The Guide 156 may advance through the list of friends, Recent Players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Matchmaking: For online, multi-player games, Matchmaking connects a game player to a session. A Match made session is an instance of game play that includes two (2) or more players or gamers playing a game until they either decide to terminate the session or until the session meets its end criteria (as defined by the game). The person who creates the session is the host. Some games are hostless, meaning that the game does not assign any special function to the person who originated the game. In such a case, the originator may, in fact, be a person who was searching for a session with specific criteria and, when it was not found, the game created a session for the person and advertised it for others to match into it. Matchmaking involves joining a session that has, as a minimum, one player already in place. A session is said to be joinable if there are open slots available to the person seeking a slot and the game play has not yet begun (the game is in "lobby" state). Some games that have join in progress sessions will advertise that a session is joinable until every public slot is filled. A gamer makes a Match by selecting "Matchmaking" in a game or in an out-of-game Matchmaking system. The Matchmaking UI may allow a gamer to add some filters to his search for a session (e.g. like specifying a map or difficulty level), or it may push a gamer directly into a search query. In most cases, with or without filters, a gamer is given a session search result which consists of a list of sessions. Each session is defined by a session descriptor that includes a short summary the most salient information about that session. A gamer then selects a session and joins it. Typically, a player then enters a lobby and awaits other players to match into the game before game play begins. In some cases, no search result is shown, and players are dropped instead directly into the lobby of the game that best meets their search criteria.

One kind of matchmaking, "Social Matchmaking," included in this system leverages User Profile data and the "Affiliates List" to improve the social dynamics of match sessions. When a game player chooses to matchmake into a session in the system described here as "Social Match," in the first session, the profile data he has set describing himself is used to "prime the pump" and find the best fellow new gamers to play with. Just by playing, the game player associates with a group of fellow gamers who become Recent Players on an "Affiliates List" (described below). The service preferably prioritizes playing with Recent Players over strangers in future session, but once a game player give positive feedback, these "positive feedback" people are remembered by the system and are given even higher priority. Over time, as a gamer becomes very familiar with a set of players, he invites them to become friends. These friend gamers are given the highest priority.

This Social Matchmaking system will connect people who have similar intent and who share a similar profile to insure that they all have a good time, in and out of game play (but primarily in game play). Matchmaking—with its use feedback and profile data—facilitates people expanding and refreshing their online community with increasingly refined matches over time. Ultimately, Matchmaking will bind people to the service as a safe, secure place to meet new people and create a history of positive experiences.

Several of the aspects of User Profile that surface in a Gamercard can be used to match a game player to a session. At a high level, according to an aspect of the invention when a game player signs up in the service 150, he is asked to select a Gamer Zone that best describes the kind of social environment he prefers to play in. Before the service has other profile data to use, this Gamer Zone is used to match the game player with other players who have selected the same Zone. This match is done by a simple database query looking for Social sessions that contain a majority of players with this same Zone.

As time goes on and the service has additional data about each player, this Match query can be improved by averaging multiple key aspects of User Profile (still the Zone, but as time goes on, also feedback reputation, skill computed via stats, and his experience defined by Achievements achieved) for each participant in a session. The system then can provide a session "profile" that can be compared with the User Profile of a player seeking a match. The match system can then query this session profile by comparing it to the values in a User Profile of an individual who wishes to join the session. If the match of the User Profile is sufficiently close to the session profile values (sharing the same Zone and within a pre-specified range for each of the numeric values for reputation, skill, and experience), then the user will be shown that session as a Match. If the match comparison is not within the pre-specified ranges, then the user's query will continue on to compare to other sessions' session profiles until a positive result is achieved. NAT type, physical proximity to other players, time played on the system, games played, etc. all are folded in on the back end when a Match search is performed.

In addition to Matchmaking based on a query with User Profile, the Social Matchmaking system, in conjunction with the tracking of friends, Recent Players, and feedback on Recent Players, builds a network of Affiliates who are prioritized for Match.

The Affiliates list is a prioritized list of people for a player that includes (1) Friends (i.e. people who the player has invited, and who have accepted the invitation, to a preferred social network that allows exchange of messages and state information), (2) Positive Feedback people (i.e. people about whom the player has given positive feedback), and (3) Recent Players. The Social Matchmaking service always looks first (before conducting the query above) for the presence of Affiliate sessions on the service. If any person on a player's Affiliates list is online and in a joinable session, the service will return that session. If there are multiple Affiliate sessions, the ones with Friends are given priority over those with Positive Feedback People or those with Recent Players. Positive Feedback People are given priority over Recent Players.

In accordance with the above, FIG. 6 illustrates a list of Recent Players in the Guide 156. A person is added to a player's Recent Players list when the player has played an online game session with the person. The Gamercard displayed when browsing Recent Players shows the base area and an extended area that provides information regarding recent games, feedback, and presence of the Recent Players. FIG. 7 illustrate further details that may be obtained about Recent Players, such as general achievements.

Figure 8:
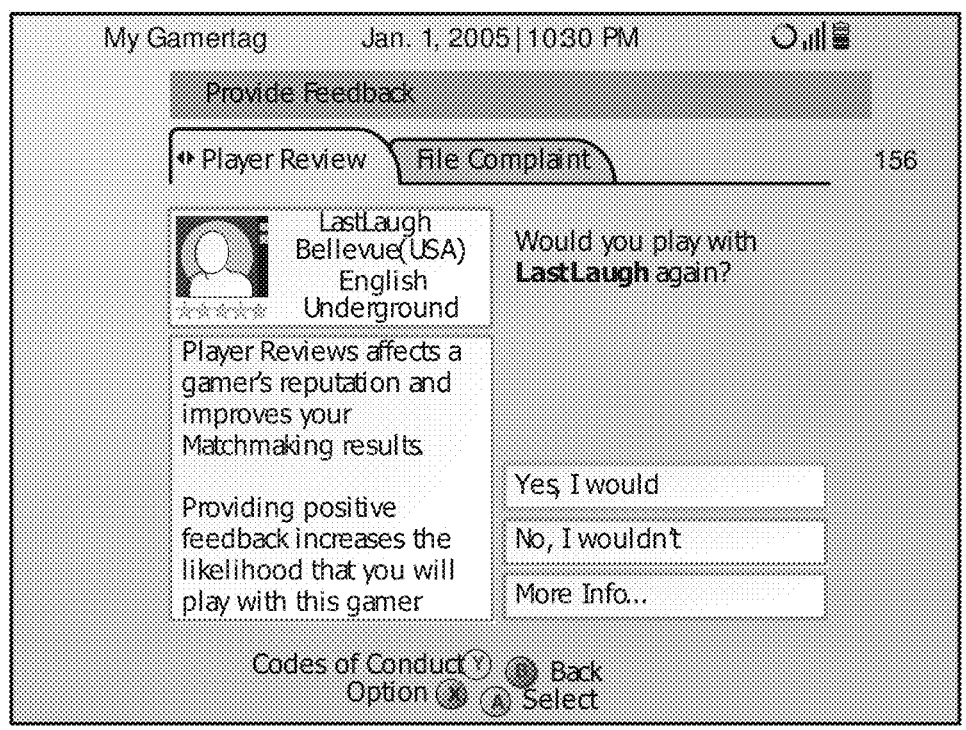
FIG. 8 illustrates a feedback mechanism whereby a game player can provide feedback on other game players.

Importantly, FIG. 8 illustrates a feedback mechanism whereby a game player can provide feedback on other game players. This feedback options is only available on a Gamercard when the viewing player has played with the person before. This feedback information is then used to improve matchmaking results, i.e., indicates whether or not you would want to play with this game player in future games. By giving positive feedback on a person, that person moves up in priority in that player's Affiliates list. Moreover, the feedback affects the game player's reputation and may change the group of players with whom the player is grouped in future games.

Feedback is, then, for the purposes of Matchmaking, the creation of a "one-way" friends list, i.e., a low threshold mechanism to build a list of people you meet again and again. This mechanism is generally invisible except as an improved matchmaking experience. For example, when a game player indicates that he would like to play with a particular person again, the system tracks that information in a one-way friend list so that the other player doesn't have to be invited or accept an invitation to be on a friends list.

If a player gives negative feedback on a person, that person moves to an "Avoid" list, and for the purposes of Social Matchmaking, future sessions containing that person will be avoided for the player.

In additional to social matchmaking as described above (using User Profile data and matching with Affiliates), the system also offers a "Ranked Match" option that matches players only based on their skill in a particular game. This skill, collected as a game statistic, is also stored in the User Profile. Skill-based match is preferred by competitive players.

Out-of-game Matchmaking is a multi-part system for creating sessions (as defined above) that includes setting up a game in the match configuration tool, generating a user interface out-of-game (i.e. in the console system app UI) that allows gamers to search for a session according to game parameters and the social attributes (User Profile, Affiliates list) known by the service. It also includes a console system app UI (part of the Guide) that allows players to browse Gamercards and invite their Affiliates (friends, Recent Players, and positive feedback people) to assemble a Party of players. The system then offers a "StartSession" message that passes from the console system to the game a schematized list of game settings and unique player IDs associated with each Gamercard. It also includes a set of APIs that allow the console and the game to manage the groupings of players assembled in the console application by associating each grouping with a unique ID that can be passed back and forth from console to game. And finally, it includes "GameCompleted" message that allows the game to pass the list of players back to the console application when the players finish the game but wish to stay together as a party and roam to another game.

The Match Configuration Tool allows game developers to input the game's matchmaking session description according to a schema. With the tool, the game tells the service the steps that a gamer will need to go through to create a multi-player on-line game session. This definition makes sure that service understands all of the key game permutations (from map names to vehicle types) so that the service can capture the starting point of a game session. The match configuration tool includes a node that allows games to create one set of Ranked customized settings and one set of Social customized settings. The two edit screens should be identical, except for the "Ranked" v. "Social" label at the top of each screen. These edit screens will be used to created out-of-game match UI that allows gamers to create customized match queries (ala Optimatch) in the Guide.

Each edit screen allows a game developer to insert a simple list of contexts and/or properties from those he has already created or that are predefined in the tool ("number of player," for example, is pre-defined since it is required for all games). Contexts are enumerated lists of strings whereas properties are numeric values (integers or floating point values). An example of a context is "Map" and its enumerations would include all the possible maps available in the game. The game developer can also create and insert new contexts and properties.

For each context and property added, the game developer must also provide a localized string label that provides the text that will appear next to the multi-select options in the out-of-game match UI. The default localized string label should be the string label for the context or property itself.

The default value for context values in the UI will be based on the default chosen when the context values were created. For properties, however, the developer must specify the range of values, the step size (for numeric properties), and the default.

For each context specified, the game must indicate the minimum and maximum number of players allowed for each context value setting. For example, for a "map" context, the game might specify that a minimum of 2 player and a maximum of 16 players can play on the "Waterloo" context value.

"StartGame" message: The system also provides the format of a StartGame message that the game will need to accept when a gamer has created a session in the out-of-game application according to the schema defined in the configuration tool. This message includes the session choices (map, difficulty level etc.) that the gamer chose based on the options the game developers indicated in the configuration process. With this message, the game can then inject the gamer into a lobby to await others to join the session via matchmaking.

The StartGame message contains the following information:
 PUIDs for all gamers in the session
 Host PUID (for Standard games)
 Ranked/Standard Flag
 Unique Party ID
 Game settings (set in "Customize" screen in the system app UI by session host or acting host)—sent as context/property list.

When a game receives a StartGame message, it must accept all of the players into a pre-game lobby. In that lobby, for Ranked games the game should begin a countdown and then inject the players into game play. No gamer should have the option to adjust the game settings. For a Social game, the host may choose to adjust game settings if needed, and some detailed game settings (e.g. choose car color etc.) may be available to all gamers. The host may then start the game, or the game can start the game as it normally would when a sufficient party is created.

GameCompleted Message. When a game is completed and the host chooses to return his party to the out-of-game lobby from the post-game lobby, the game must return a GameCompleted message.

The GameCompleted message contains the following information:
 PUIDs for all gamers in the session (the same as the list from the StartGame message, minus any members who dropped out of the party or disconnected their consoles)
 Host PUID (for Standard games; the host may have changed if the game allows for host migration and the original host dropped out of the game)
 Party ID
 Game Title ID
 Last game settings (these are sent back so that the console app can cache them for the host so that they are pre-set next time the host selects the game in the system app UI)

Session and Party API. A session and party management API supports party creation and should facilitate "play again" scenarios by creating 2 flavors of session ID for each gathering of players for game play. The first session ID (A, in the example below) is a kind of "meta-session" (the Party) associated with the host of the game (and in a hostless game or in a case of host-migration, the ID A is associated with the person who is the under-the-covers host—identified as host in the game code but not explicitly identified as a host to the players). As gamers join the party in the pre-game lobby (or as they accept invites and gather with the host) in the out-of-game console system, they join this party ID (A).

When party is passed to the game, the session starts (XSessionCreate), a new, second session ID (B) is also assigned to the group by the game and is used until the session tracked just within the game is deleted (XSessionDelete). The party ID (A) persists with the host and all of the gamers who have joined the party.

When game play starts, the game play session is tracked with a third ID, C, created when XSessionStart is called. This ID is used to track all stats associated with each player who actually plays in the round.

In a game that has open slots but where join in progress is not allowed, once game play begins, new gamers can continue to join this party ID A (and B, if the game allows) and can wait in the out-of-game match lobby UI in the console even while the session ID C remains closed (because the game is in progress). These new gamers who joined A can further wait in a game lobby (associated with B) for the other gamers to finish.

All data about the actual game play is associated with the ID C. In a join-in-progress game, a new gamer would need to join both the second ID (B) and the third ID (C) at the same time, then, to participate in the game play. If the host permits, the person could also be joined to the party ID (A).

When the round of game play ends (XEndSession), the gamers may choose to play again (in unranked game only). If they do, the party ID remains (and allows them to play again, keeps them together) as well as the overall game session ID (B), but the game play session ID (C) is abandoned as soon as XEndSession is called. When a new round of play starts (XStartSession) a new, new game play session ID (ID D) is generated for the party.

The game must retain the party ID and the information that this was an out-of-game match created game. At the end of each session of game play (Ranked games only allow one round of gameplay so this is not relevant, but the game can offer a "Convert to Standard" game that allows one gamer to designate himself as host and automatically send invites to the other gamers to join him in an out-of-game match lobby), the game must offer the host to return the party to the out-of-game lobby or to play again. If he selects to return to the out-of-game lobby, the game must send the console a GameCompleted message and must end the game play session with the XSessionDelete API.

The party ID A is deleted only when the host disbands the group of players from the out-of-game match lobby or, in cases with host migration, when no new host takes over the game. The flow looks like this:

| Host API call/activity | Player2 API call/activity | Player3 API call/activity | Tracking ID for group |
|---|---|---|---|
| XCreateParty | | | A is created in console code. |
| Out of Game Lobby | | | A |
| | Query XJoinParty | | A |
| | Out of Game Lobby | | A |
| | | Query XJoinParty | A |
| | | Out of Game Lobby | A |
| StartGame message passed from console app to game. Host selects a game from out-of-game match UI, inserts game disk, and inputs the game settings. | Player prompted to insert game disk. | Player prompted to insert game disk. | Console passes StartGame message--with all game settings and list of players--to game code |
| XCreateSession | XCreateSession | XCreateSession | B is created by game to track the gathering of players in the game (A persists in the background) |
| In-Game Lobby XStartSession | In-Game Lobby XStartSession | In-Game Lobby XStartSession | B C (game-play session ID) is created by game while A and B persist in the background. |
| Game play | Game play | Game play | Stats are tracked for all of the players associated with C. |
| XEndSession | XEndSession | XEndSession | C is closed (A, B persist in the background) |
| In-Game Lobby | In-Game Lobby | XDeleteSession Player chooses to quit game at this point and return to out-of-game lobby to wait for Player1 and Player2. | All players associated with B remain together to play next session. A persists in the |

-continued

| Host API call/activity | Player2 API call/activity | Player3 API call/activity | Tracking ID for group |
|---|---|---|---|
| | | GameCompleted message sent. | background so that player who quits game and calls GameCompleted can wait in out-of-game lobby. |
| XStartSession | XStartSession | Out-of-game lobby. | D is created (A, B persist in the background) |
| Game play | Game play | Out-of-game lobby. | D (A, B persist in the background) |
| XEndSession | XEndSession | Out-of-game lobby. | D is closed (A, B persists in the background) |
| In-Game Lobby | In-Game Lobby | Out-of-game lobby. | Player1 and Player2 remain associated by A, B. Player3 is still waiting in out-of-game lobby, associated with A only. |
| XDeleteSession | XDeleteSession | Out-of-game lobby. | B is closed in game. |
| GameCompleted message | GameCompleted message | Out-of-game lobby. | Game passes GameCompleted message back to console. |
| Out-of-game lobby. | Out-of-game lobby. | Out-of-game lobby. | All players gather together again in out-of-game lobby. |
| Host decides to dissolve party. | | | |
| XDeleteParty | XDeleteParty | XDeleteParty | A is closed and all players go their separate ways. |

Once the configuration process is complete and the game has instrumented its code so that it can accept the StartGame message from the service, manage the grouping of players with the session and party API, and pass back the GameCompleted message to the service when the group wishes to leave the game, the service can render the out-of-game matchmaking User Interface (UI) in the console system application. The UI consists of the three main parts: find a session, create a session (to allow others to search and join), and browse/find people to assemble a party. That UI is better understood with reference to FIG. 11. Initially at step 1102, the player has completed that matchmaking process with other players that match the criteria of friends and/or Affiliate. The system then indicates the number of players that meet the matchmaking criteria selected by a player. The UI presents a player with three selections: selection A essentially provides the game player with the ability to find a game that has been started by another player and to join that session. In that case, the UI presents to the player a list of games and allows the player to select a game screen at step 1104. The screen displays a number of games (e.g., Halo, PGR, etc.) along with the number of gamers and the number of Affiliates/friends in each game. This additional information about where the player's Affiliates (friends, Recent Players, and positive feedback people) are currently playing helps in making the game selection. After selecting a particular game, a Select a Session Screen 1106 lists the total number of sessions at the top of the screen (each filter reduces the number of sessions) and allows the gamer to proceed with one of three options:

The first option is Select a Session (each session listed by Session Descriptor that includes key attributes about the people and settings of the session). The session selection puts the player into the out of game lobby 1114. There, the player will wait until a start game message is sent to the player's console 100 to start the game session. If the player chooses this option, he will usually be dropped into a hostless game (i.e. a game where no one player controls the settings). The game settings may be chosen at random. "Hostless" games cannot return together to the out-of-game Lobby. When the game ends, the players can choose to continue in the same game with the same settings, the game can choose to randomly rotate the game settings, or the players can leave.

Figure 11:
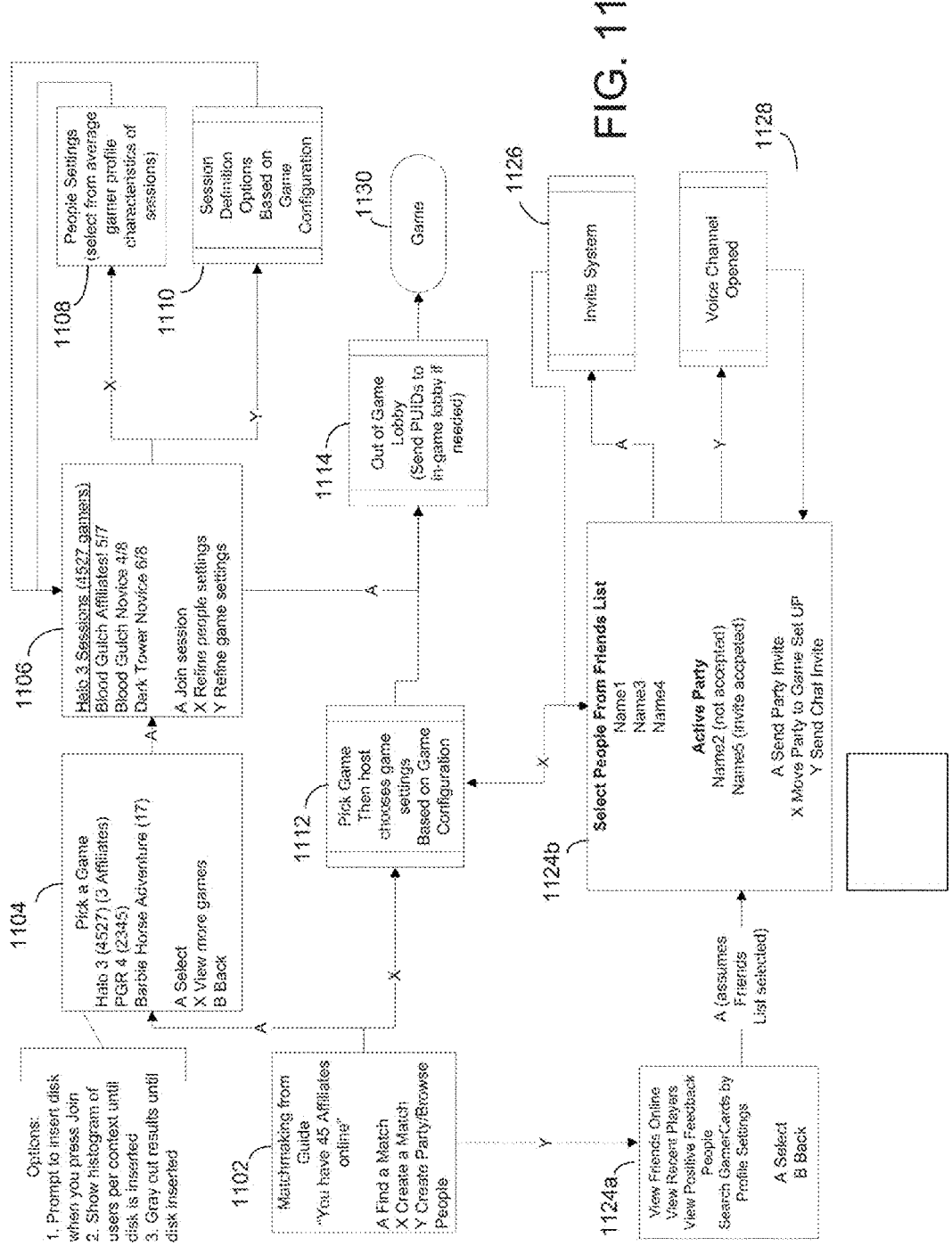
FIG. 11 is a flow chart illustrating the user interface flow in setting up a matchmaking session.

The second option is to Filter on People Settings (including reputation, skill, type of gamer, e.g., casual, hardcore, etc.). FIG. 11 depicts this activity in box 1108. This step leverages the User Profile but allows the player to choose which aspects of his profile to emphasize in filtering the long list of sessions available.

Filter on Game Settings offers a subset of Session Definition options described in the configuration process, above. For example, a player may desire to filer on a particular game level so that only sessions at that level will appear in the screen selections. The Filter on Game Settings is depicted by box 1110. Among game settings is the ability to choose "Hostless" v. "Hosted (Party)" games.

Figure 9:
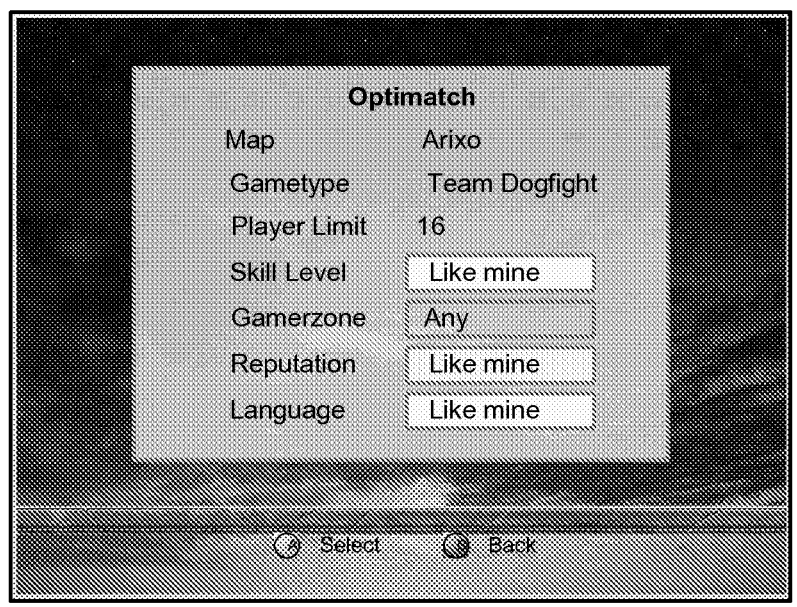
FIG. 9 illustrates a user interface whereby players can filter choices for a matchmaking session and then choose among a list of sessions according to their descriptors.

FIG. 9 depicts a UI for a particular game where both the Game Settings and People Settings may be filtered in one simple screen.

Figure 10:
FIG. 10 also illustrates a user interface whereby players can filter choices for a matchmaking session and then choose among a list of sessions according to their descriptors.

When choosing among session, the player can view a session descriptor for each session. The system app UI shows a per-game-mode session descriptor that contains a summary of key User Profile averages for the session, a summary of the major game settings, and a "Session Label" that identifies the type of game play in the session (defined by the "Zone" of the players in the game). This data helps a player get an "at-a-glance" view of each session so that he can pick the best one to join. The data in the session descriptor includes:

Game name
Host's name
Community reputation rating of the players in the game
Atmosphere or rules of the game (e.g., use of mature language, level of competitiveness)
Game settings (e.g., type of game, level or track being played)
Connection speed (i.e., ping)
Skill level of the players in the game
Whether there are friends of yours in the game
Whether there are friends of your friends in the game
Whether there are people you have enjoyed playing with previously in the game
Language spoken in the game
The country game is being hosted in FIG. 10 depicts a UI where a player is selecting a particular session (the yellow boxed selection) among a list of sessions and is viewing some of the session descriptor details.

If the player would rather create a game session rather than join an existing session, the player can select create a match as illustrated by selecting "X" and moving to step 1112. In that case, the player proceeds to a screen that allows the player pick a game title for which he would like to create a session. At that point, the player can define the game based on the game configuration options. For example, the player can select the level of play, the number of players, and so on. After the player defines the game session (defined by the game in the configuration process), the player enters a game lobby until participants join. That game session will then show up on other gamers screens that were searching for a game to join (i.e., as illustrated in steps 1104 and 1106). Games set up in this way are "hosted" games (hosted by the player who created the session) that result in a game "Party," and when the are completed, all of the players must have the option of either continuing in the same game, letting the host change the game settings for that game, or returning to the out-of-game lobby.

Private Parties are managed in by identifying the assembly of players in the party separately from the gathering of players for a particular session of game play.

In addition to waiting for gamers to join the game session, the player can actively seek participants and build a Party by choosing "Create a Party." As shown in step 1124, the player can browse the Gamercards on friends list, Recent Players list and or otherwise find gamers with User Profiles that meet certain search criteria, e.g., having a certain skill level, locale, and/or reputation, or who are otherwise friends or Affiliates. After finding the various matching gamers, the player can invite them to join a Party session directly by sending that gamer an invite to the Party session. If the player accepts the invite he is joined in the OOG match Party lobby. Alternatively, a voice channel can be opened whereby the gamers can communicate, e.g., about the game session. Finally, while browsing for gamers, selected gamers can be added to the player's Affiliates list so that they will be noted as Affiliates in future game selections.

The Party Lobby (1112, when accessed from the "Create a Party Flow" allows the designated host to choose among all games available on his played games list and all the played games list of players currently in the Party Lobby. It will call out those games on the host's list that are not available to one or more players in the lobby. If the host chooses to play one of the games unavailable to one or more players, those players can wait in the lobby for the party to return or can leave. The host will not be able to start a game that drops all the players.

When the players have completed game play in a party game, the game must give the players the option to return to the OOG match party lobby. The game must send back to the system a "Game Completed" message. The out-of-game party lobby allows the group of players to remain together and communicate with each other with the host player designated to choose which game to play next and, once the game is chosen, which settings for the game to choose (map etc.)

Because of the limitations of the game (as specified in the Session Description), some game types may not be available to the party (e.g. if there are 6 people in the party, some game types may not be selectable because only 4 players are allowed).

Out-of-game Completions: According to another aspect of the system, leveraging the out-of-game matchmaking described above, the system can create out-of-game competitions. The steps include: First, setting up a game in the configuration tool; second, setting up a competition in the configuration tool; third, generating a UI out-of-game, (both on the web and in the Guide) that allows gamers to both create and search for a competition; fourth, passing a game a "start session" message with the gamer's ID along with unique session identifiers when the competition has been created on the web or in the Guide; and fifth, enabling a game to pass back a "session completed" message to the web and/or Guide along with unique session identifiers and results of the session.

As mentioned above, the configuration tool allows game developers to input the game's matchmaking session description according to a genre-specific configuration data. Additionally, the tool allows game developers to select competition contexts to combine with the matchmaking session description according to a genre-specific configuration. In addition to the configuration parameters discussed above, the competition uses at least two additional parameters: competition definitions and unique session identifiers. The competition definition or definitions define how the game communicates to the service the appropriate competition contexts a gamer can select in combination with Session definition. The unique session identifiers provide the format of unique session identifiers that a game must accept, maintain, and hand back to the web and/or Guide at the completion of the unique session. The identifier(s) will include the position of the individual gamer in a competition, round, and match-up based on the player created a competition structure on the web or in the Guide. This was enabled when the game developer defined competition contexts during the configuration process.

Figure 12:
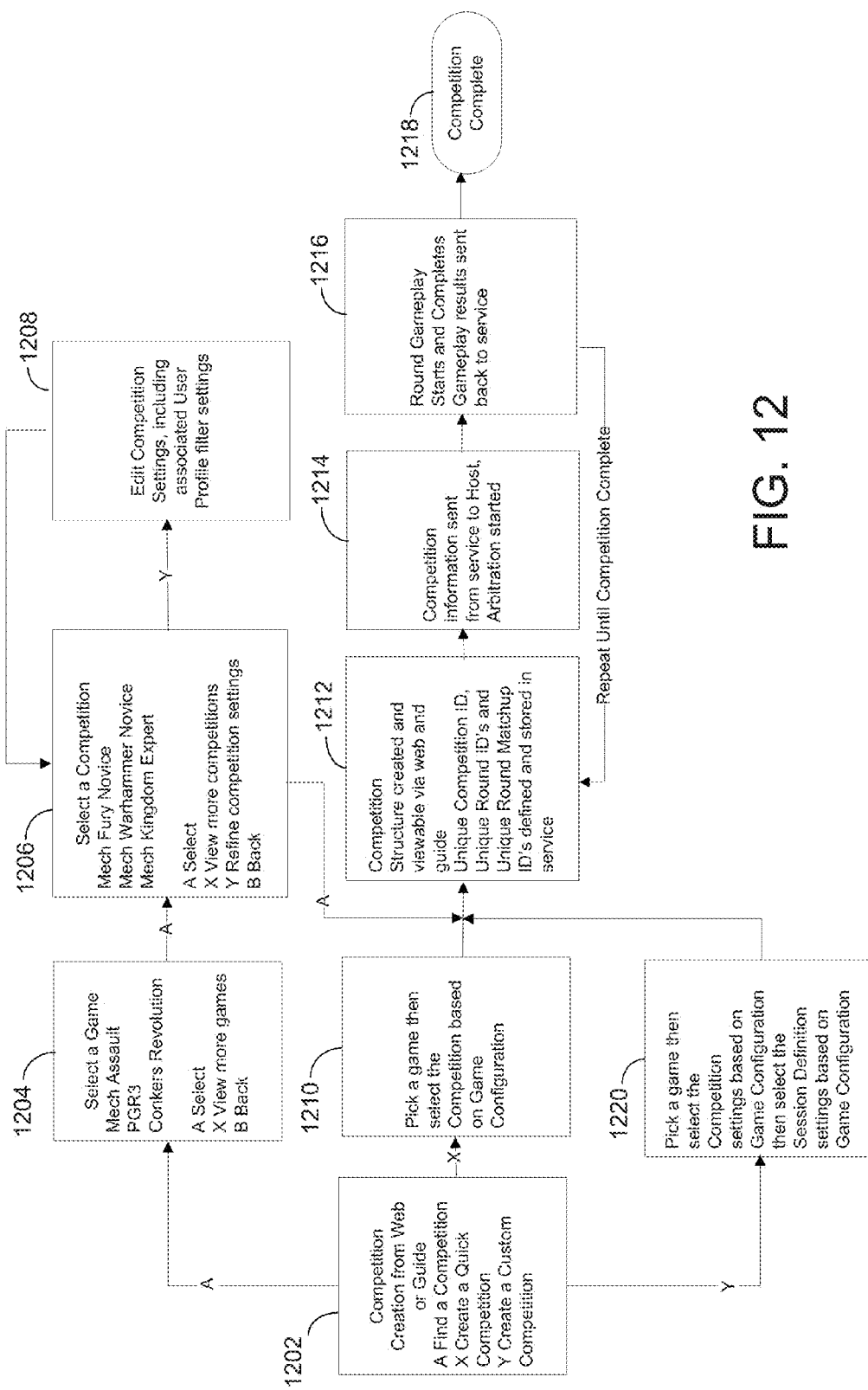
FIG. 12 is a flow chart of a competition set up process.

When the configuration process is complete, the service can render the out-of-game competition UI on the web or in the console Guide. FIG. 12 further illustrates the operation of the competition flow. Initially at step 1202, the player has the option of finding an existing competition (selection A), creating a quick competition (selection X), or creating a custom competition (selection Y). If the player selects the option of finding a competition, a UI screen is presented (step 1204) that allows a player to select a game that he or she would like to compete in, e.g., Mech Assault, Project Gotham Racing (PGR), and so on. The select a game screen displays the games available with competitions that are enabled, e.g., for which someone has already set up a competition. After selecting a game from the interface, a screen (step 1206) is displayed that presents a listing of all of the competitions that are currently open along with those in progress. There is also information presented about the experience level and type of participants in these competitions based on their Gamer Profile. At that point, the player can select a competition to enter or further refine the competition search. If the player opts to refine the competition search (step 1208), the player can filter on the competition contexts and gamers participating in the competitions, e.g., player reputation, locale, etc. If, on the other hand, the player opts to enter a competition, the player proceeds to step 1212 to begin the competition.

Rather than selecting to join an existing competition, the player can create a new competition and invite other to join via the process described above with respect to steps 1204, 1206 and 1208. A player has two options to create an out-of-game competition. First is quickly enter a competition out-of-game on the web or in the Guide that was previously defined in its entirety via the configuration process. That is, the game developer provides a predefined competition setting for a game that is provided to the service via the configuration data. In that case, the player selects a game and then selects one of the available predefined competitions for that game (step 1210). Similarly, the player can create a custom competition by selecting a game that has competition enabled and defining the various parameters for the competition that were defined by the configuration data for that game, e.g., the number of rounds, single elimination, and so on (step 1220). A player selects these options on the web or in the Guide and creates a competition structure.

Whichever, mechanism the player engages to enter the competition, after entering the competition, the service maintains the competition structure and is viewable on the service over a web connection or directly from the Guide on the console. The competition structure for example includes the topology of the competition, e.g., single elimination tree structure, match ups of the various competition entrants, and so on. A competition home is set up where the topology and match-ups are viewable, both on the web and in the Guide, by all participants (step 1212). Thereafter, the information is sent to the host console 100, e.g., the lobby unique ID, unique competition ID, unique round ID and unique match ID and the game play arbitration is started (step 1214). Each round then starts and completes. At then end of each round, each console sends results back to the host along with the competition ID, unique round ID and unique round match ID (step 1216). Thereafter the next round of competition is set up by the service and the process repeats until the competition is complete at step 1218.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A method for playing a multi-player computer-based game, comprising:
    maintaining a database with information about a plurality of players and information about the plurality of players with respect to a plurality of different games that were played on separate computing devices by executing the game program locally;
    generating a user profile for a player from information in the database, the user profile including at least one of: information about the player provided by the player, feedback from other players about the player, game-related information about the player, and system-related information about the player;
    comparing information in the user profile for a player to settings in a game session profile for a game session, and when the user profile information matches the game session profile sufficiently, showing the game session to the user as a match result; and
    outputting a start message to a computing device for the player and to a plurality of computing devices of other players that selected the at least one game session, substantially simultaneously, wherein said message contains information indicative of the configuration settings such that the game programs executing locally can set the configuration settings.

2. The method of claim 1, comprising:
    receiving at least one of: an in-game statistic and win/loss data from a game as game-related information.

3. The method of claim 1, comprising:
    collecting game-related information from a game console, wherein the game-related information is tracked by the game and the game console while the game-console is in an off-line state.

4. The method of claim 1, comprising:
    displaying the user profile visually in a Gamercard interface comprising at least one of a base area and a context-specific area.

5. The method of claim 1, comprising:
    identifying one or more user profiles of other players according to search criteria; and
    sending an invitation to join a party session of a game to the identified players.

6. The method of claim 5, wherein the search criteria include at least one of: a game parameter and a social attribute.

7. The method of claim 5, comprising:
    generating a first session ID associated with a host of the game;
    adding a player that joins the party to the first session ID;
    generating a second session ID and assigning the second session ID to the party by the game;
    generating a third session ID when game play begins, wherein the third session ID is used to track statistics associated with each player who actually plays in a specific round of the game; and
    abandoning the third session ID when the specific round of the game ends.

8. The method of claim 7, comprising:
    allowing the party to play the game again in a second specific round when the previous specific round of the game ends;
    retaining the first and second session IDs;
    generating a fourth session ID for the second specific round of the game to track statistics associated with each player who actually plays in the second specific round of the game; and
    deleting the first session ID when the host disbands the party.

9. The method of claim 1, comprising:
    collecting skill information in a particular game as game-related information about a player; and
    matching players according to the collected skill information.

10. A system for playing a multi-player computer-based game, comprising:
- a service having a database that collects information about a information about a plurality of players and information about the plurality of players with respect to a plurality of different games that were played on separate computing devices by executing the game program locally, generates a user profile for a player from information in the database, the user profile including at least one of: information about the player provided by the player, feedback from other players about the player, game-related information about the player, and system-related information about the player; and compares information in the user profile for a player to settings in a game session profile for a game session, and when the user profile information matches the game session profile sufficiently, shows the game session to the user as a match result; and
- an output device coupled to said service for outputting a start message to a computing device for the player and to a plurality of computing devices of other players that selected the at least one game session, substantially simultaneously, wherein said message contains information indicative of the configuration settings such that the game programs executing locally can set the configuration settings.

11. The system of claim 10, the service further to collect game-related information from a game console, wherein the game-related information is tracked by the game and the game console while the game-console is in an off-line state.

12. The system of claim 10, the service further to identify one or more user profiles of other players according to search criteria; and send an invitation to join a party session of a game to the identified players.

13. The system of claim 10, the service further to collect skill information in a particular game as game-related information about a player; and match players according to the collected skill information.

14. A system for computer-based game playing, comprising:
- a service to which a plurality of game players can connect via a network connection from a computer device associated with each player, said computing device associated with each player having at least a first selected game stored thereon; and
- computer-executable instructions maintained by the service for:
- maintaining a database with information about a plurality of players and information about the plurality of players with respect to a plurality of different games that were played on separate computing devices by executing the game program locally;
- generating a user profile for a player from information in the database, the user profile including at least one of: information about the player provided by the player, feedback from other players about the player, game-related information about the player, and system-related information about the player;
- comparing information in the user profile for a player to settings in a game session profile for a game session, and when the user profile information matches the game session profile sufficiently, showing the game session to the user as a match result; and
- outputting a start message to a computing device for the player and to a plurality of computing devices of other players that selected the at least one game session, substantially simultaneously, wherein said message contains information indicative of the configuration settings such that the game programs executing locally can set the configuration settings.

15. The system of claim 14, the computer-executable instructions further comprising instructions for displaying the user profile visually in a Gamercard interface comprising at least one of a base area and a context-specific area.

16. The system of claim 14, the computer-executable instructions further comprising instructions for:
- identifying one or more user profiles of other players according to search criteria; and
- sending an invitation to join a party session of a game to the identified players.

17. The system of claim 16, wherein the search criteria include at least one of: a game parameter and a social attribute.

18. The system of claim 16, the computer-executable instructions further comprising instructions for:
- generating a first session ID associated with a host of the game;
- adding a player that joins the party to the first session ID;
- generating a second session ID and assigning the second session ID to the party by the game;
- generating a third session ID when game play begins, wherein the third session ID is used to track statistics associated with each player who actually plays in a specific round of the game; and
- abandoning the third session ID when the specific round of the game ends.

19. The system of claim 18, the computer-executable instructions further comprising instructions for:
- allowing the party to play the game again in a second specific round when the previous specific round of the game ends;
- retaining the first and second session IDs;
- generating a fourth session ID for the second specific round of the game to track statistics associated with each player who actually plays in the second specific round of the game; and
- deleting the first session ID when the host disbands the party.

20. The system of claim 14, the computer-executable instructions further comprising instructions for
- collecting skill information in a particular game as game-related information about a player; and
- matching players according to the collected skill information.

* * * * *